Dec. 30, 1952     L. PREMOLI     2,623,745
ELASTIC ASSEMBLY
Filed Sept. 21, 1950     2 SHEETS—SHEET 1
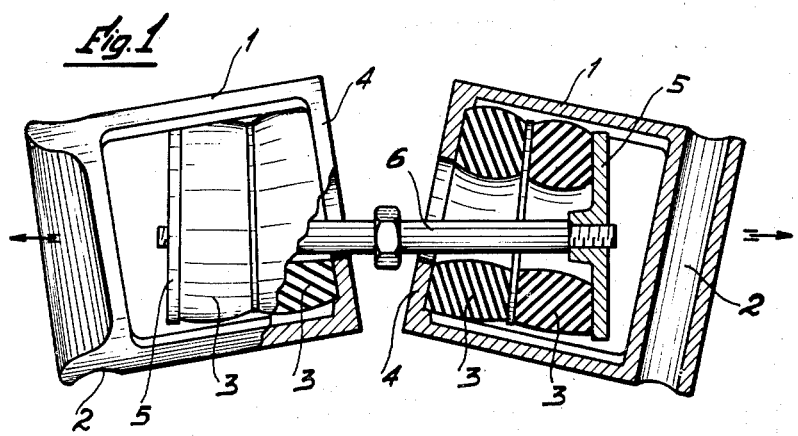
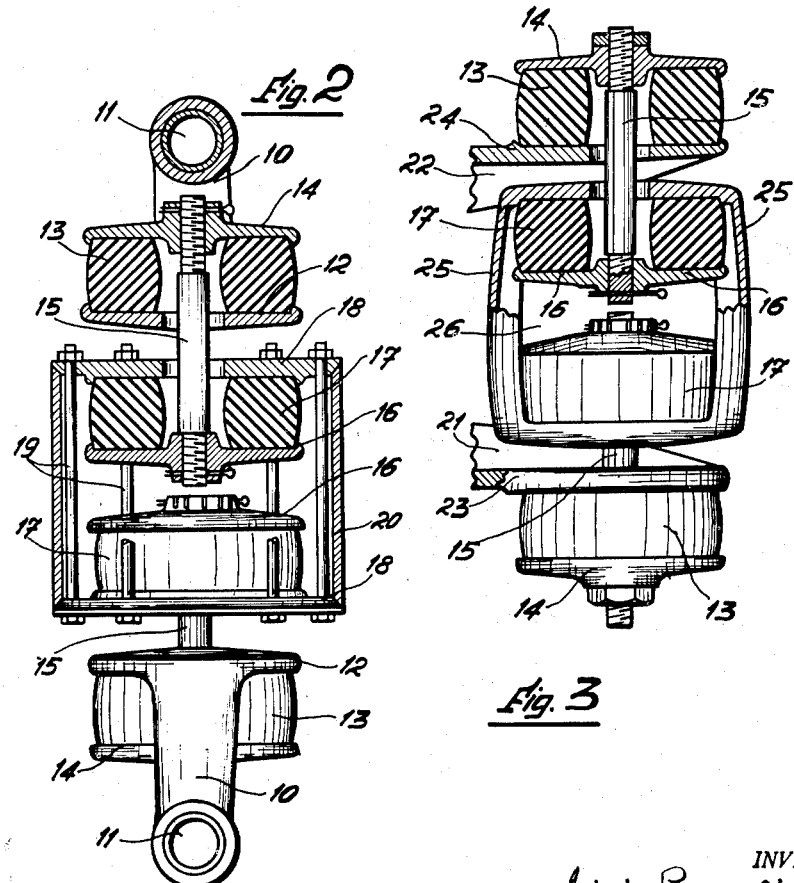
INVENTOR.
Luigi Premoli
BY
Michael S. ...

Patented Dec. 30, 1952

2,623,745

UNITED STATES PATENT OFFICE 2,623,745

ELASTIC ASSEMBLY

Luigi Premoli, Milan, Italy

Application September 21, 1950, Serial No. 185,941
In Italy October 5, 1949

4 Claims. (Cl. 267—63)

The present invention relates in general to an elastic assembly suitable for use as a spring support for light and heavy motor-vehicles, trailers, and so on, and for landing gears of airplanes, and more particularly the present invention relates to an elastic assembly of the type comprising a number of compressible rubber members or bodies, located against each other so as to attain a required thickness of elastic material producing the desired amplitude of the movement of the borne structure relative to the bearing structure, that is to say the desirable amplitude of up and down movement of the vehicle frame relative to the wheel axes.

One object of this invention is to provide an elastic assembly in which a fairly large number of elastic members are included so as to reduce the thickness of any single rubber body to avoid any possibility of irregular deformation and chiefly of bending of the rubber body under compression, while the total thickness of the elastic material, that is to say the sum of the thicknesses of the several rubber bodies, may be increased at will.

Another object of the present invention is to provide an assembly in which the alignment of the different rubber members is assured on a theoretical line along which the stresses are exerted, while the assembly according to the invention does not comprise a guiding system or device to keep the moving parts in a fixed area where slidable or rotatable members are located.

A further object of the invention is to provide an elastic assembly which allows some degree of irregular relative movements of the two ends of the assembly, that is to say, the assembly according to the invention may efficiently operate even if the path along which one end of assembly moves is a curved or irregular line relative to the straight theoretical line along which the stresses are exerted.

A still further object of the present invention is to provide such an elastic assembly, the bulk or external size of which may be adapted to a small space in which the assembly is to be mounted within the vehicle, this bulk being fully utilized for elastic material, the mass and section of which is in direct relation to the suppleness and the bearing power of the assembly.

Other objects of the invention are to provide a general improvement in the construction of an assembly of the above type, which according to the invention may be cheaply and sturdily made by the combination of bodies and members in which any precise and costly forming and machining is avoided, while the assembly operates safely and noiselessly, provides long and heavy duty, and does not require care, maintenance and lubrication.

In the preceding paragraphs and throughout the following specification and claims, the word "rubber" is intended to mean any elastic, compressible material, such as natural or synthetic rubber, or any other material having similar properties, as the present invention relates to the structure and the arrangement of the assembly and not to the specific materials which may be used by any person skilled in the art; likewise, the word "height" is to be read as meaning the dimension along which compression is exerted, whatever the position, vertical, horizontal or inclined, of the mounted and working assembly.

Generally speaking, the known construction of elastic assemblies include a number of rubber compressible bodies and require the use of a corresponding number of compressed rigid members separating the rubber members and one or more guiding bars, placed outside or inside the rubber members, and along which said rigid separating members may slide, so as to oblige all the members to move along a fixed path, notwithstanding the tendency of the assembly to bend and to become irregularly deformed under compression as result of its height relatively to its transverse dimensions. This construction has been found to be subject to the following objections, to wit:

(a) The slidable parts wear out and require maintenance and lubrication, and noise and other objectionable inconveniences easily occur after long use and wear of the contacting surfaces.

(b) The presence of the rigid guiding bars makes the assembly axially compressible but transversally rigid, and it must be pivotally connected to the structure if any slight deviation of position is provided.

With the above conditions in mind, I provided a structure by which the above objects are attained substantially by the combination of a number of substantially aligned rubber bodies, any one of which is linked to the adjacent bodies, by means of rigid linking elements, arranged to work as tensile elements to obtain a tensile chain of rigid members connected one to others by means of elastically compressible members. It will be understood that the whole assembly, the ends of which tend to move away from each other, acts as a tensioned chain, in which the several members tend to set themselves along a line passing through the linked points as the stress or tension increases, thus producing a self-adjustment of the several members. The suppleness of the rubber members allows the chain to adjust itself to the various irregular positions that one end, rigid member may be obliged to assume relatively the other end member.

The above and other important objects of the present invention, which include an improved construction, and improved adjusting and connecting means and other features, will be made clear from the following specification, which is accompanied by drawings, in which:

Fig. 1 is a side elevational and partly sectional view of the simplest embodiment of the invention, in which the connected parts are shown in an exaggerated irregular position so as to demonstrate the self-adjusting tendency of an assembly constructed according to the invention.

Fig. 2 is a side elevational and partly sectional view of a preferred embodiment of the invention.

Fig. 3 shows a modified form of the embodiment shown in Fig. 2.

Figure 4:
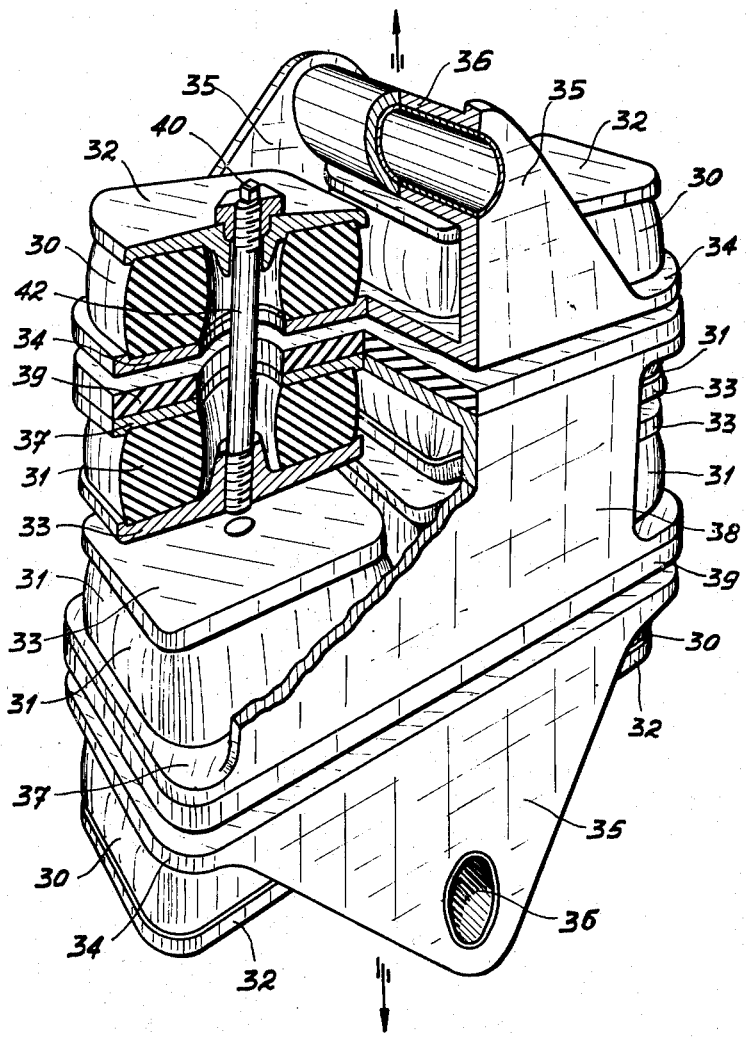
Fig. 4 is a perspective view, and in part a sectional view, of another preferred embodiment of the invention, particularly adapted to be used as spring support for heavy trucks, trailers and busses, and anywhere heavy loads are to be sustained and minimum bulk is desired.

Referring to Fig. 1, an elastic assembly according to the invention comprises at least two rubber members, or two groups of rubber members, and at least three rigid linking members, said rubber members or group of members being under compression while said linking members are under tension, and the load being applied to the two end linking members tends to separate said end members. The load is transmitted in an assembly according to the invention, through a chain which comprises at least the following elements in the following order: an end linking member which is connected to one of the relatively mobile structures of the vehicle (frame or wheel axle), a rubber compression member, an intermediate second linking member, a second rubber compression member, a third end linking member, which is connected to the other relatively movable vehicle structure (wheel axle or frame). The simplest embodiment of the invention, as shown in Fig. 1, comprises two opposite linking members 1, 1 which may be connected to the vehicle structure by means of pivots passing through transversal holes 2, 2; the connecting structure is not particularly described or shown since it may easily be made according to current knowledge in the art.

The end linking end members 1, 1 are preferably made in the form of cylindrical hollow bodies through one end of which said holes 2, 2 are drilled and in the hollow of which the rubber members 3, 3 are placed. These rubber members form two groups each comprising two members 3, 3 and these two members directly act in compression on each other so as to act practically as one rubber element. Each assembly comprising two counterposed rubber members 3, 3 is compressed between the end 4 of body 1 and one of two disk-like members 5, 5 rigidly connected to each other by means of a connecting rod 6 passing through holes formed in the ends 4. The assembly comprising the disk-like members 5, 5 and the connecting rod 6 forms the intermediate linking element.

It will be understood that the construction shown allows a considerable tilting and bending in the assembly, and likewise the assembly may be mounted and safely loaded even if a considerable tilting of the end linking members takes place. This construction is particularly suited for vehicles, the suspension devices of which comprise parts which easily bend and wear out after heavy and long duty. The maximum amplitude of the tilting and bending is determined by the relatively large diameter of the passages or holes in the rubber members 3 and in the ends 4 of bodies 1, into which the connecting rod 6 is placed and may freely move in any axial and transversal direction.

The connecting rod 6 is joined to at least one of disks 5 by means of a screw threaded engagement, and variation and adjustment of the compression of the rubber members 3 may be varied at will by rotating rod 6, conventional means being provided to avoid loosening of the adjustment.

The preferred embodiment shown in Fig. 2 demonstrates how the present invention may be practiced in the form of an assembly in which the elastic material is divided into four elastic elements. A high number of elastic elements in the chain of rubber members and linking members allows a large amplitude of relative movement of the end linking members and reduces the degree of slanting of any single rubber member, when a tilting or bending of the assembly occurs, because the total deviation from the theoretically straight position of all members is divided in several small deviations of the members relatively to each other.

The embodiment of Fig. 2, comprises two end linking elements 10, 10 provided with transversal pipe-like parts 11, 11, into which the conventional linking pivots may be fitted, and with flat disk-like parts 12, bearing the external rubber members 13, 13. The rubber members 13 are respectively compressed against parts 12 by counterposed disk-like elements 14 which are each connected to one end of a connecting rod 15, the second end of which is connected to another disk-like element 16. Between the faces of each pair of the disk-like elements 16, and 18, an additional rubber member 17 is located, the disk-like elements 18, 18 being connected to each other by means of a set of externally placed connecting rods 19. The connecting rods 19 tightly fix the edges of disk-like elements 18, 18 against the opposite edges of a short tubular member 20.

The load is transmitted from one pivot placed within a part 11 to the opposite pivot inside opposite part 11 through the tensile resiliency of one end linking member 10, the elastic resiliency under compression of one rubber member 13, the tensile resiliency of one connecting rod 15, the elastic resiliency of one rubber member 17, the tensile resiliency of connecting rods 19 then through the symmetrical set of corresponding parts 17, 15, 12 and 10. The arrangement of tensile parts of the chain, which parts alternately are placed inside and substantially along the axis of the rubber members, as is the case with connecting rods 15, 15, and outside and substantially along and near the flanks of same rubber members, as is the case with connecting rods 19 and the side arms of end members 10, provides a sturdy and easily constructed assembly. The middle linking member composed of the two disk-like elements 18, connecting rods 19 and outer tubular member 20 likewise may be sturdily constructed and easily assembled upon placing of the members 17 and parts 16 into its interior, and it forms a highly rigid body upon tightening of the connecting rods 19.

When the type and the construction of the vehicle require that the assembly according to the invention is to be arranged between two structural points located from each other by a distance which is less than the total height of same assembly, the end linking element may comprise only the disk-like parts 12, 12, means being provided for the suitable connection of said parts to the vehicle frame. If the assembly is supposed to work substantially along a straight line, that is to say that one end of the assembly is supposed to move, relatively to the other end, along a path substantially aligned with the theoretical line connecting the ends, said assembly may take the form shown in Fig. 3, in which corresponding and like parts, as shown in Fig. 2, are designated by the same reference numerals.

In the embodiment of invention shown in Fig. 3, the external rubber members 15, 15 are directly placed against the flattened ends 23, 24 of arms 21, 22 which respectively are rigidly connected to the bearing and to the borne structure of the vehicle, namely to the vehicle wheel axle assembly and to the vehicle body or frame assembly. This arrangement assures noiseless working of the device, as any pivotally linking of rigid parts is avoided and all deviations from the straight line are taken up by the rubber members. In Fig. 3 there is also shown a modified construction of the middle linking member, which is made of a one-piece body 25, this body being substantially barrel-shaped and provided with axial holes through which connecting rods 15, 15 freely pass and with large side openings 26 through which rubber members 17, 17 and disk-like elements may be inserted into the body 25 when the parts are assembled.

When the assembly is to be constructed for heavy loads and to be arranged in a vehicle structure in which a relatively small space is provided for the assembly, an embodiment of the present invention as shown in Fig. 4 may be advantageously used. With reference to Fig. 4, this embodiment of the invention comprises two chains of external rubber members 30 and internal rubber members 31 located along two parallel lines. Each pair of adjacent members 30 and 31 are linked by a connecting rod 42 joining two flat elements 32 and 33. Both external rubber members 30 adjacent to one end of the assembly are located against a single flat element 34 connected by means of side-parts 35 to a tubular element 36, in which a conventional pivot is inserted to link the assembly to one vehicle part, and both rubber members 30 adjacent to the other end of assembly likewise are arranged. The bodies comprising the elements 34, 35 and 36 form the end linking elements of the assembly. The pairs of internal rubber members 31, which are located side by side, are each placed against a single flat element 37, the elements 37 being rigidly connected and symmetrically arranged by the side-parts 38 and the body comprising the flat elements 37, 37 and side parts 38 forming the middle linking element. This arrangement of parts allows a considerable reduction in the transversal dimension of the assembly, consequently easing the placement of the same in the vehicle structure. The decreased degree of bending of the assembly in its longitudinal plane does not constitute an inconvenience, because any movement in this plane is freely permitted by the pivotal connection of the end linking members to the vehicle structure, while the decreased transversal dimension of the rubber mass proportionally increases the amplitude of bending and tilt in the transversal plane.

In Fig. 4 is shown a way to make fully make use of the bulk of the assembly relative to the load bearing power of the same assembly. This result is attained by making the rubber members substantially in a square shape, the corners of which are conveniently rounded. By means of this shaping, the whole cross section of the rubber mass approaches the cross section of whole assembly.

The division of the bearing chain in two chains of rubber and linking elements offers other advantages too: it allows a reduction of the total height of the assembly, because the transversal tubular elements are not placed on the axes of connecting rods, and it allows an easier assembling of the parts and easier handling of the tops 40 of connecting rods 42, when assembling, disassembling and adjustment are required.

In Fig. 4 is shown a simple means for avoiding direct contact and hard shocks between rigid members, when a sudden decreasing of load occurs. This means takes the form of a thick sheet of rubber 39 placed between any pair of adjacent flat surfaces of flat elements 34 and 37. A corresponding feature may be applied to the other disclosed and equivalent embodiments of the invention, the sheet preferably having the form of thick rubber, or an equivalent elastic material, shaped in correspondence to the outline of the adjacent surfaces of rigid linking members whose direct contact is to be avoided.

It will be understood that each of the elements described above, or two or more together, may also find a useful application in other types of elastic assemblies differing from those described above. Therefore, while I have illustrated and described the invention as embodied in few different arrangements of parts, I do not intend to be limited to the precise construction and to the details shown, since various modifications and structural changes may be made without departing in any way from the spirit and the scope of my invention.

Without further analysis, the foregoing will so fully reveal the gist of my invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. Apparatus for interconnecting two parts which tend to move away from each other, comprising, in combination, a rigid frame having opposite end walls respectively formed with a pair of opposite bores and respectively having inner faces located opposite each other; a pair of first compressible, resilient means respectively located against said inner faces and about said bores to form free spaces aligned with the latter; a pair of elongated bars having a cross-section substantially smaller than said bores and respectively extending through the latter and said free spaces so that said bars respectively have first ends located between said end walls and opposite second ends located beyond said end walls; a pair of first plates respectively fixed to said bars adjacent said first ends thereof and respectively bearing against said pair of first resilient means; a pair of second plates respectively fixed to said bars adjacent said second ends thereof and each having a side face located opposite said frame; a pair of second compressible, resilient means respectively located against said side faces of said second plates, about said bars and spaced from the latter; and a pair of third plates respectively located between said frame end walls and said pair of second resilient means and against the latter, said third plates respectively being formed with a pair of bores of a substantially larger size than the cross-section of said bars and through which the latter extend, said third plates respectively being adapted to be connected to the parts which tend to move away from each other.

2. Apparatus for interconnecting two parts which tend to move away from each other, comprising, in combination, a rigid frame having opposite end walls respectively formed with a pair of opposite bores and respectively having inner faces located opposite each other; a pair of first rubber rings respectively located against said inner faces and about said bores to form free spaces aligned with the latter; a pair of elongated bars having a cross-section substantially smaller than said bores and respectively extending through the latter and said free spaces so that said bars respectively have first ends located between said end walls and opposite second ends located beyond said end walls; a pair of first plates respectively fixed to said bars adjacent said first ends thereof and respectively bearing against said pair of first rubber rings; a pair of second plates respectively fixed to said bars adjacent said second ends thereof and each having a side face located opposite said frame; a pair of second rubber rings respectively located against said side faces of said second plates, about said bars and spaced from the latter; a pair of third plates respectively located between said frame end walls and said pair of second rubber rings and against the latter, said third plates respectively being formed with a pair of bores of a substantially larger size than the cross-section of said bars and through which the latter extend; and a pair of connecting means respectively joined to said third plates for respectively connecting the latter to the parts which tend to move away from each other.

3. Apparatus for interconnecting two parts which tend to move away from each other, comprising, in combination, a rigid frame having opposite end walls respectively formed with a pair of opposite bores and respectively having inner faces located opposite each other; a pair of first compressible, resilient means respectively located against said inner faces and about said bores to form free spaces aligned with the latter; a pair of elongated bars having a cross-section substantially smaller than said bores and respectively extending through the latter and said free spaces so that said bars respectively have first ends located between said end walls and opposite, second ends located beyond said end walls; a pair of first plates respectively fixed to said bars adjacent said first ends thereof and respectively bearing against said pair of first resilient means; a pair of second plates respectively fixed to said bars adjacent said second ends thereof and each having a side face located opposite said frame; a pair of second compressible, resilient means respectively located against said side faces of said second plates, about said bars and spaced from the latter; a pair of third plates respectively located between said frame end walls and said pair of second resilient means and against the latter, said third plates respectively being formed with a pair of bores of a substantially larger size than the cross-section of said bars and through which the latter extend, said third plates respectively being adapted to be connected to the parts which tend to move away from each other; and a pair of cushioning means respectively mounted on said frame end walls between the latter and said third plates to cushion the movement of the latter toward said frame end walls.

4. Apparatus for interconnecting two parts which tend to move away from each other, comprising, in combination, a rigid frame having opposite end walls respectively formed with a pair of opposite bores and respectively having inner faces located opposite each other; a pair of first rubber rings respectively located against said inner faces and about said bores to form free spaces aligned with the latter; a pair of elongated bars having a cross-section substantially smaller than said bores and respectively extending through the latter and said free spaces so that said bars respectively have first ends located between said end walls and opposite, second ends located beyond said end walls; a pair of first plates respectively fixed to said bars adjacent said first ends thereof and respectively bearing against said pair of first rubber rings; a pair of second plates respectively fixed to said bars adjacent said second ends thereof and each having a side face located opposite said frame; a pair of second rubber rings respectively located against said side faces of said second plates, about said bars and spaced from the latter; a pair of third plates respectively located between said frame end walls and said pair of second rubber rings and against the latter, said third plates respectively being formed with a pair of bores of a substantially larger size than the cross-section of said bars and through which the latter extend; a pair of connecting means respectively joined to said third plates for respectively connecting the latter to the parts which tend to move away from each other; and a pair of layers of rubber respectively mounted on said frame end walls between the latter and said third plates to cushion the movement of the latter towards said end walls.

LUIGI PREMOLI.

REFERENCES CITED

The following references are of record in the file of this patent:

UNITED STATES PATENTS

| Number | Name | Date |
|---|---|---|
| 1,734,072 | Blalack | Nov. 5, 1929 |
| 1,779,663 | Cowell | Oct. 28, 1930 |

FOREIGN PATENTS

| Number | Country | Date |
|---|---|---|
| 549,020 | Great Britain | Nov. 3, 1942 |